United States Patent [19]

Wong

[11] Patent Number: 4,729,088

[45] Date of Patent: Mar. 1, 1988

[54] REGULATED HIGH FREQUENCY POWER SUPPLY

[75] Inventor: John M. Wong, Buffalo Grove, Ill.

[73] Assignee: Advance Transformer Company, Chicago, Ill.

[21] Appl. No.: 57,394

[22] Filed: May 11, 1987

[51] Int. Cl.$^4$ .............................................. H02M 3/335
[52] U.S. Cl. .................................... 363/124; 363/26; 323/224; 323/266
[58] Field of Search ..................................... 363/24–26, 363/124; 323/224, 266

[56] References Cited

U.S. PATENT DOCUMENTS

| | | | |
|---|---|---|---|
| 4,245,286 | 1/1981 | Paulkovich | 363/21 |
| 4,251,857 | 2/1981 | Shelly | 363/26 |
| 4,347,560 | 8/1962 | Seiersen | 363/24 |
| 4,502,104 | 2/1985 | Mitchell | 363/26 |
| 4,660,135 | 4/1987 | Lee | 323/266 X |
| 4,661,896 | 4/1987 | Kobayashi et al. | 363/124 X |

Primary Examiner—Patrick R. Salce
Assistant Examiner—Emanuel Todd Voeltz
Attorney, Agent, or Firm—Robert T. Mayer

[57] ABSTRACT

A power supplier for providing a regulated high-frequency AC output with a bucking and boosting section and a push-pull output section in which a common switching element is used in both the bucking and boosting section and in the push-pull output section.

8 Claims, 5 Drawing Figures

REGULATED HIGH FREQUENCY POWER SUPPLY

This is an invention in a regulated high frequency converter.

In developing a high frequency AC voltage from a low frequency AC supply or from a DC supply it is known to use an oscillator with a pair of switching transistors operated in a push-pull mode. In this known circuit a rectified AC current or a DC current is provided through a series choke coil to the center tap on the primary winding of a transformer. Separate switches connect the ends of the primary winding to ground. A capacitance is connected from the center tap to ground. In turning on the switches alternately and rapidly a high frequency current is induced in the secondary of the transformer.

Where supply voltages vary in amplitude it is also known to provide a buck-boost circuit which will provide a consistent output voltage without regard to the input voltage.

It is an object of this invention to provide an improved power supply including both a buck-boost regulator stage and a push-pull output stage.

One of the features of the invention is the use of the same element to function as part of both the regulator stage and the push-pull output stage.

One of the advantages of the invention is that the bucking mode of operation lowers maximum input voltages to the push-pull stage which is especially desirable where excessively high supply voltages are encountered.

Another advantage of the invention is the high power factor it exhibits when operating in the bucking mode with a full wave rectified AC input voltage.

Another advantage of the invention is that the boosting mode of operation raises the voltage to the push-pull stage which is especially desirable where excessively low supply voltages are encountered since it permits the use of more efficient high voltage, low current switches in the push-pull stage as opposed to less efficient low voltage, high current switches.

In carrying out the invention there is provided a power supply including an inductance and capacitance connected in series circuit to receive current from a current source. A junction is provided in the series circuit between the inductance and capacitance. A first switch means is provided which can be turned on to enable current to flow from the source through the inductance and capacitance. A second switch means is provided which can be turned on to provide for the flow of current from the source in a path in parallel with the capacitance. Control means causes the first and second switch means to be on simultaneously for predetermined periods. A transformer is provided with a primary having first and second ends and a center tap. The center tap is connected to the junction of the series circuit. A third switching means is connected to provide a path for current flow from the first end of the primary when the third switching means is turned on. The second switching means provides a path for current flow from the second end of the primary when it is turned on. The control means turns the second and third switching means on alternately.

Other objects, features and advantages of the invention will become clear to those skilled in the art from the following description and the appended claims when taken in conjunction with the accompanying drawing, in which:

Figure 1:
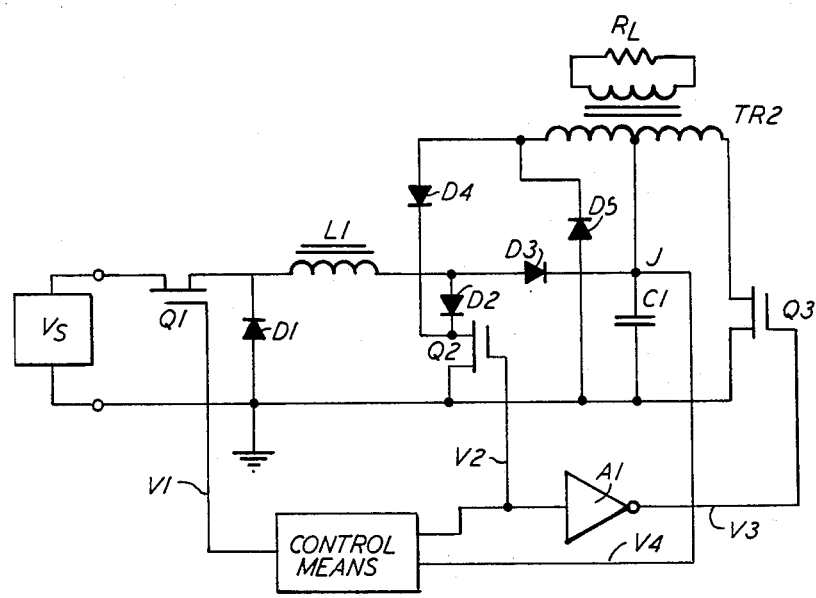
FIG. 1 is a wiring diagram of the regulated power supply of the invention.

Referring to FIG. 1 there is shown an inductance L1 and a capacitance C1 connected in series circuit with diode D3 to receive current from a source $V_S$. A junction J is formed in the series circuit between inductance L1 and capacitance C1. A first switch means in the form of transistor Q1 is provided to be turned on to enable current to flow from source $V_S$ through inductance L1 and capacitance C1. A second switch means in the form of transistor Q2 is provided to be turned on to provide with diode D2 a path for the flow of current from source $V_S$ in a circuit parallel to that provided by diode D3 and capacitance C1. The control means shown in FIG. 1 produces signals along lines V1 and V2 to turn on first and second switching means Q1 and Q2. The voltage at junction J is applied to the control means by line V4 to control the on time for transistor Q1.

Transformer TR2 includes a primary with a center tap connected to junction J of the series circuit comprising inductance L1 and capacitance C1. A third switching means comprising transistor Q3 when turned on provides a path for current flow from a first end of the primary of the transformer TR2 to ground. Transistor Q2 and diode D4 provide a path for current flow from the second end of the primary of transformer TR2 to ground. The control means and amplifier A1 provide signals along line V3 to turn on transistor Q3 during periods which alternate with the times transistor Q2 is turned on. Load $R_L$ is connected across the secondary of transistor TR2. Diode D1 with the predetermined polarity shown closes a circuit comprising inductance L1, diode D3 of the same predetermined polarity as diode D1 and capacitance C1. Diode D5 is provided to balance the effect of the inherent diode (not shown) across transistor Q3 so that both halves of the push-pull stage are more closely identical.

A bucking mode of operation of the power supply of FIG. 1 will now be explained with relation to the timing diagrams of FIG. 2. A bucking mode of operation takes place when the voltage provided by source $V_S$ is higher than that which it is desirable to apply to the primary of transformer TR2. Under these conditions, transistor Q1 is rendered conductive by the voltage along line V1 for half or less than half of the time period for one cycle of operation of transistors Q2 and Q3. This conductive time decreases as the voltage at $V_S$ increases. As those skilled in the art will understand, the on time for transistor Q1 could be controlled by the magnitude of the voltage at $V_S$ but it is presently preferred to use the voltage at junction J to do this. Those skilled in the art will also understand that, in accordance with good engineering practices, the control means would include a duty cycle control safety circuit to prevent circuit damage which could occur during transient periods if high voltages are present at $V_S$.

Figure 2:
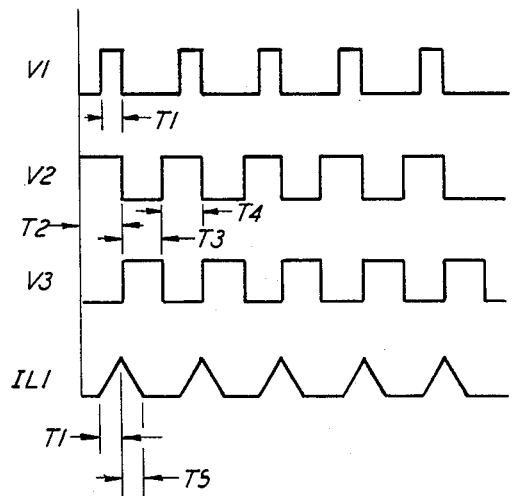
FIG. 2 is a time diagram of various voltage waveforms and a current waveform produced while the power supply is in a bucking mode of operation.

The waveforms of FIG. 2 have been drawn with the understanding that steady state conditions have been reached. Under these conditions, transistor Q1 is turned on during time period T1 which partially overlaps time period T2 during which transistor Q2 is conductive. During this time an increasing current IL1 (see lowest waveform on FIG. 2) flows from source $V_S$ through transistor Q1, inductance L1, diode D2 and transistor Q2. Transistor Q2 and diode D2 act as an effective short across C1 while L1 is charging. In this way the charging time for obtaining a particular current through inductance L1 is decreased over what it would be if capacitance C1 were in the charging circuit as in previous arrangements. After inductance L1 is charged the desirable amount, both transistors Q1 and Q2 are turned off at the beginning of time period T3 whereby inductance L1 discharges through capacitance C1.

Transistor Q2 performs two functions. It is part of the output circuit for the push-pull converter as well as being part of the charging circuit for inductance L1. As can be seen from FIG. 2, current IL1 builds through inductance L1 for the time period T1 while transistors Q1 and Q2 are both on. This current is dissipated during time period T5 while transistor Q3 is on and both transistors Q1 and Q2 are off. The dissipation takes place through the right-hand side of the primary of transformer TR2 and transistor Q3 as well as through the circuit provided by inductance L1, diode D3, capacitor C1 and diode D1. In this way when steady state conditions have been obtained for a given voltage at $V_S$ an average DC voltage is established across capacitance C1 to supply the push-pull stage.

Figure 3:
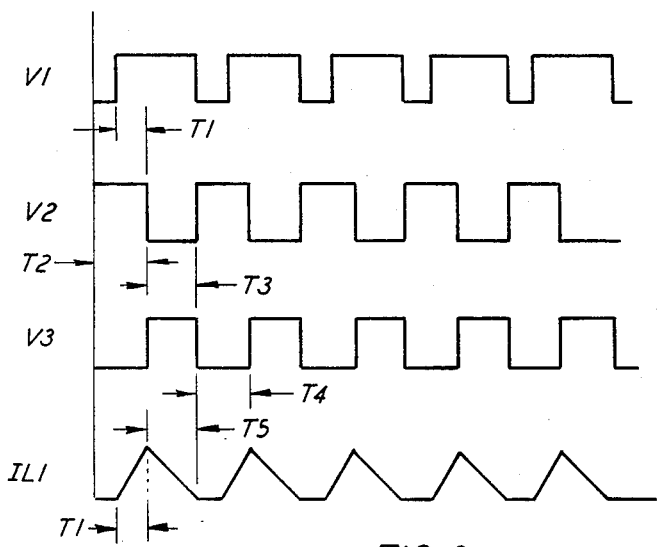
FIG. 3 is a time diagram of various voltage waveforms and a current waveform produced while the power supply is in a boosting mode of operation.

A boosting mode of operation of the power supply will be described with relationship to FIG. 3. In this mode of operation, transistor Q1 is turned on for from 50% to 100% of the time period of one cycle of operation of transistors Q2 and Q3. The time transistor Q1 is on is indirectly proportional to the amplitude of the voltage at $V_S$. As can be seen from the waveform for the voltage along line V1, this means that transistor Q1 is turned on to coincide with all of the time period that transistor Q3 is turned on plus for part of all of the time period that transistor Q2 is turned on. By leaving Q1 on after Q2 has turned off the voltage induced in choke L1 during time period T1 is added to the voltage across the current source $V_S$ as a supply to capacitance C1 and a boosting operation is accomplished. As in the bucking operation, the current through choke L1 decays during time period T5. With this arrangement for a given voltage at $V_S$ an average DC voltage is again established across capacitance C1 to supply the push-pull stage.

Figure 4:
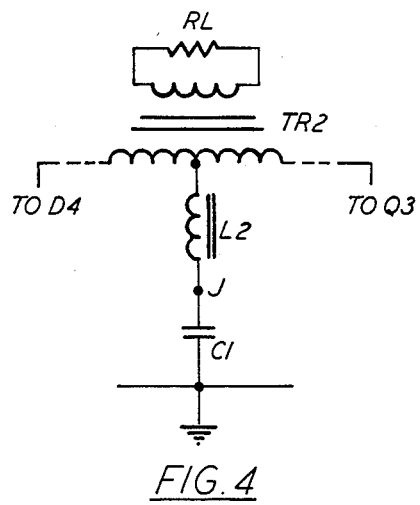
FIG. 4 is a partial wiring diagram showing an alternative to the embodiment of FIG. 1.

FIG. 4 shows an alternative embodiment in which an additional choke L2 is connected between the center tap of the primary of transformer TR2 and junction point J. As is known, this makes the push-pull output stage of the power supply a current controlled one as opposed to the voltage controlled one it is without inductance L2.

Figure 5:
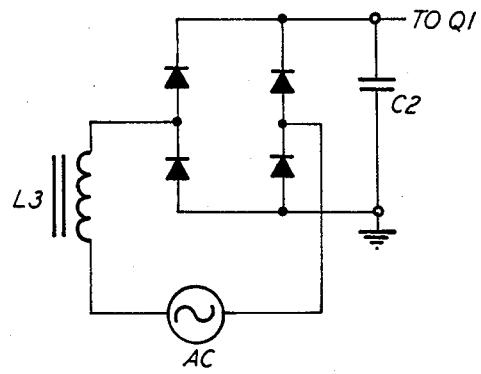
FIG. 5 is a partial wiring diagram showing an alternative to the input section of the power supply of FIG. 1.

FIG. 5 shows an arrangement in which the current source $V_S$ is in fact a full wave rectified AC input. Choke L3 and capacitance C2 are provided to filter out high frequency line current harmonics.

Operation with discontinuous inductor current as described for both the bucking mode and the boosting mode is presently preferred because with a rectified AC line as the current source $V_S$, a constant duty cycle for transistor Q1 provides high input power factors in the bucking mode. As those skilled in the art will understand this is so because under these conditions the average current into capacitance C2 of FIG. 5 will be proportional to the voltage on capacitance C2 especially when transistor Q1 is operating at a high frequency duty cycle. If operation with continuous inductor current is desirable, it can be readily obtained by providing a larger choke L1 than is provided for discontinuous operation.

It is understood that various modifications to the above described arrangement will become evident to those skilled in the art and that the arrangement described herein is for illustrative purposes and is not to be considered restrictive.

What is claimed is:

1. A power supply including an inductance and a capacitance connected in series circuit to receive current from a source thereof; a junction in said series circuit between said inductance and said capacitance; first switch means which can be turned on to enable current to flow from said source through said inductance and capacitance; second switch means which can be turned on to provide for the flow of current from said source in a path in parallel with said capacitance; control means causing said first and second switch means to be on simultaneously for predetermined periods; a transformer primary with a first and second end and a center tap, said center tap being connected to said junction; third switching means connected to provide a path for current flow from said first end of said primary when turned on; said second switching means providing a path for current flow from said second end of said primary when turned on; and said control means turning said second and third switching means on alternately.

2. A power supply as claimed in claim 1, wherein the inductance and capacitance each have first and second terminals and wherein a diode with a predetermined polarity is connected between the second terminal of the inductance and said junction point and the first terminal of said capacitance is connected to said junction point and wherein a second diode of the same predetermined polarity is connected between the second terminal of said capacitance and the first terminal of said inductance.

3. A power supply as claimed in claim 2, wherein a diode is connected in said path of current flow in parallel with said capacitance whereby current can flow in only one direction through said second switch means.

4. A power supply as claimed in claim 3, wherein a diode is connected in said path for current flow from said second end of said primary whereby current can flow in only one direction from said second end through said second switch means.

5. A power supply as in claim 4, wherein said control means turns said first and second switch means off simultaneously whereby said power supply operates in a bucking mode.

6. A power supply as in claim 4, wherein said control means leaves said first switch means on while turning off said second switch means whereby said power supply operates in a boosting mode.

7. A power supply as in claim 4, wherein said control means is connected to said junction and operates in response to voltage at said junction to control the duty cycle of said first switch means.

8. A power supply as in claim 7, wherein a choke is connected between said junction and said center tap.

* * * * *